United States Patent [19]

Follensbee

[11] Patent Number: 5,378,252
[45] Date of Patent: Jan. 3, 1995

[54] ABRASIVE ARTICLES

[75] Inventor: Robert A. Follensbee, Cottage Grove, Minn.

[73] Assignee: Minnesota Mining and Manufacturing Company, Saint Paul, Minn.

[21] Appl. No.: 116,444

[22] Filed: Sep. 3, 1993

[51] Int. Cl.⁶ ................................ C09K 3/14
[52] U.S. Cl. ........................... 51/298; 51/293
[58] Field of Search ............... 51/293, 295, 298

[56] References Cited

U.S. PATENT DOCUMENTS

| | | | |
|---|---|---|---|
| 2,111,006 | 3/1938 | Robie | 51/280 |
| 2,205,276 | 6/1940 | Robie | 51/280 |
| 2,599,506 | 6/1952 | Wooddell et al. | 51/298 |
| 2,958,593 | 11/1960 | Hoover et al. | 51/295 |
| 4,311,489 | 1/1982 | Kressner | 51/298 |
| 4,396,657 | 8/1983 | Ibrahim | 428/36 |
| 4,547,204 | 10/1985 | Caul | 51/298 |
| 4,588,419 | 5/1986 | Caul et al. | 51/295 |
| 4,652,274 | 3/1987 | Boettcher et al. | 51/298 |
| 4,652,275 | 3/1987 | Bloecher et al. | 51/298 |
| 4,735,632 | 4/1988 | Oxman et al. | 51/295 |
| 4,751,138 | 6/1988 | Tumey et al. | 428/323 |
| 4,773,920 | 9/1988 | Chasman et al. | 51/298 |
| 4,799,939 | 1/1989 | Bloecher et al. | 51/293 |
| 4,903,440 | 2/1990 | Larson et al. | 51/298 |
| 4,927,431 | 5/1990 | Buchanan et al. | 51/298 |
| 5,011,513 | 4/1991 | Zador et al. | 51/295 |
| 5,152,917 | 10/1992 | Pieper et al. | 51/295 |
| 5,213,591 | 5/1993 | Celikkaya et al. | 51/293 |
| 5,221,296 | 6/1993 | Schwerzel et al. | 51/298 |
| 5,236,472 | 8/1993 | Kirk | 51/298 |

FOREIGN PATENT DOCUMENTS

0500369A2  8/1992  European Pat. Off. .
2120263B  11/1983  United Kingdom .

OTHER PUBLICATIONS

"New Developments in Waterbased Radiation Curable Resins", Paul H. Stenson, ICI Resins US, Wilimington, Mass., USA.

Primary Examiner—Mark L. Bell
Assistant Examiner—Deborah Jones
Attorney, Agent, or Firm—Gary L. Griswold; Walter N. Kirn; David L. Weinstein

[57] ABSTRACT

An abrasive article comprising a plurality of abrasive particles bonded together, bonded into a substrate, or bonded onto a backing by a cured binder, the cured binder being formed by solidifying a binder precursor comprising an aqueous acrylate polymer emulsion. In preferred embodiments, the binder precursor includes a phenolic resin.

36 Claims, 1 Drawing Sheet

ABRASIVE ARTICLES

BACKGROUND OF THE INVENTION

1. Field of the Invention

The invention relates to abrasive articles.

2. Discussion of the Art

Abrasive articles typically comprise a plurality of abrasive particles and a binder. There are a number of different types of abrasive articles on the market. These include (1) coated abrasive articles, in which the binder bonds the abrasive particles to a backing material (e.g., "sandpaper"), (2) lapping coated abrasive articles, in which the abrasive particles are first dispersed in a binder precursor and the resulting dispersion is bonded to a backing material, (3) bonded abrasive articles, in which the binder bonds the abrasive particles together to form a shaped mass, e.g., a grinding wheel, and (4) nonwoven abrasive articles, in which the binder bonds the abrasive particles into a nonwoven fibrous substrate.

The binder of the abrasive article is typically formed by curing a binder precursor, which is in liquid form. The binder precursor typically comprises a resin. During the manufacture of the abrasive article, the binder precursor is exposed to an energy source, which results in the polymerization of the resin, thereby forming the binder. The energy source can provide thermal energy, or radiation energy, e.g., electron beam, ultraviolet light, or visible light. In recent years, radiation-curable resins have been employed because of their advantages over thermally-curable resins, e.g., faster cure times, lower capital investments in buildings and equipment, and lower energy costs. Examples of radiation-curable resins are acrylate-based resins.

The high viscosity of many radiation-curable resins tends to cause processing problems. Accordingly, organic solvents or diluents are sometimes added to lower the viscosity of binder precursors that comprise radiation-curable resins. However, removal and recovery of organic solvents is expensive, and solvents and diluents pose safety and environmental concerns.

Radiation-curable resins have been combined with thermally-curable resins, e.g., phenolics, to improve the properties of the binder.

SUMMARY OF THE INVENTION

The invention provides an abrasive article having improved grinding properties. The abrasive article comprises a plurality of abrasive particles either bonded together by a binder or bonded into or onto a substrate by a binder. The binder is formed by curing a binder precursor that comprises an aqueous acrylate polymer emulsion. The use of an aqueous acrylate polymer emulsion provides the binder with excellent properties, including enhanced strength for superior grinding. The preferred binder is formed by curing a binder precursor which includes an aqueous acrylate polymer emulsion containing a dispersing agent, a thermally curable resin, and, optionally, a curing agent. Upon curing, the binder precursor polymerizes or crosslinks to form a thermosetting binder.

The binder precursor of the invention can be used in all types of abrasive articles, including bonded abrasive articles, coated abrasive articles, lapping coated abrasive articles, and nonwoven abrasive articles. Preferably, the binder precursor is radiation-curable, more preferably curable by ultraviolet radiation.

Preferably, the binder precursor includes, in addition to the aqueous acrylate polymer emulsion, a thermally-curable resin or polymer, more preferably a phenolic resin. Preferably, the ratio of the weight of solids in the acrylate polymer emulsion to the weight of solids in the phenolic resin ranges from about 1:7 to about 9:1.

Preferably, the aqueous acrylate polymer emulsion includes a dispersing agent to stabilize the emulsion, and the acrylate polymer in the emulsion is an acrylated urethane or acrylated polyester. Some preferred binder precursors further include a latex emulsion or polyvinyl alcohol or both.

The preferred binder precursors are substantially free of organic solvents and other volatile organic compounds. Accordingly, the compositions for preparing binder precursors that are useful in this invention are "environmentally friendly." Additionally, the preferred binders of the invention exhibit excellent adhesion to substrates to which adhesion is typically difficult, e.g., polyester film.

DETAILED DESCRIPTION

Figure 1:
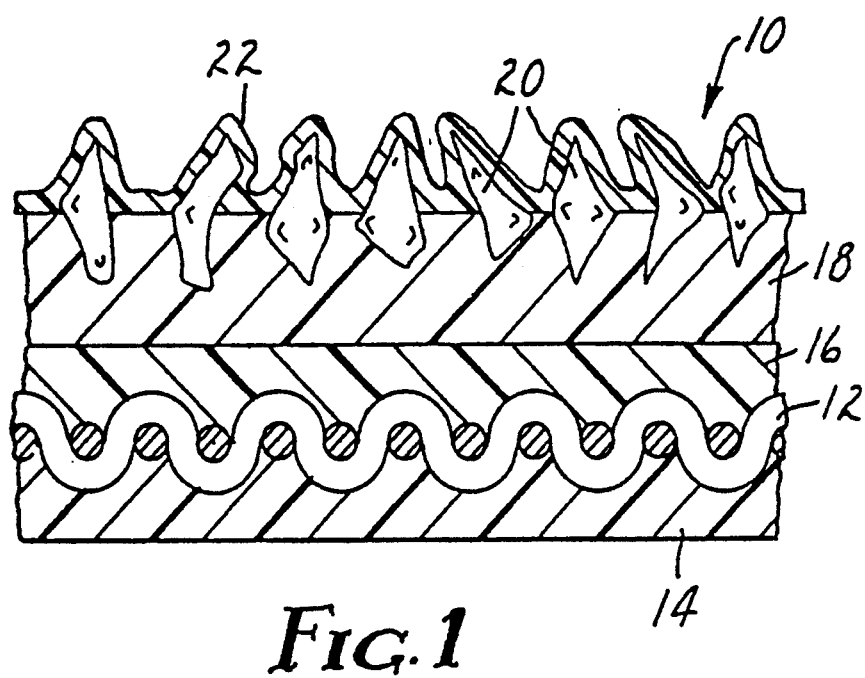
FIG. 1 illustrates in cross-section a coated abrasive article having a cloth backing material.

As illustrated in FIG. 1, the coated abrasive article generally indicated as 10 has a cloth backing. Backing 12 has been treated with an optional backsize coat 14 and an optional presize coat 16. Overlaying the presize coat 16 is a make coat 18 in which are embedded abrasive particles 20 such as silicon carbide or aluminum oxide abrasive grits. A size coat 22 has been placed over the make coat 18 and the abrasive particles 20. There is no clear line of demarcation between the saturant coat and the presize coat which meet in the interior of the cloth backing, which is saturated as much as possible with the resins of these coats.

The present invention also includes bonded abrasive articles, which include a plurality of abrasive particles bonded together by the binder of the invention to form a shaped mass. The binder of this invention can also be used in nonwoven abrasive articles.

Abrasive particles suitable for this invention typically have a particle size ranging from about 0.1 to about 1500 micrometers, preferably from about 1 to about 1300 micrometers. It is preferred that the abrasive particles have a Mohs' hardness of at least about 8, more preferably greater than 9. Examples of such abrasive particles include fused aluminum oxide, ceramic aluminum oxide, heat treated aluminum oxide, silicon carbide, white aluminum oxide, alumina zirconia, diamond, ceria, cubic boron nitride, garnet, and combinations thereof. The term abrasive particles also encompasses single abrasive particles which are bonded together to form an abrasive agglomerate. Abrasive agglomerates are further described in U.S. Pat. Nos. 4,311,489, 4,652,275, and 4,799,939, all of which are incorporated herein by reference.

The aqueous acrylate polymer emulsions suitable for this invention contain a plurality of droplets of an acrylate polymer suspended in water, preferably with the aid of a dispersing agent. The size of these droplets preferably ranges from 5 to 5,000 nanometers, more preferably from 10 to 1,000 nanometers, and most preferably from 30 to 300 nanometers in size. The acrylate polymer from which the droplets are formed contains at least one acrylate functional group. Preferably, the polymer has at least two and often three or four acrylate functional groups. During curing of the binder precursor, polymerization or crosslinking of the acrylate polymer occurs at the site of the acrylate group or groups.

Acrylate polymers suitable for this invention include acrylated urethanes, acrylated acrylics, acrylated epoxies, aminoplast derivatives having pendant alpha, beta unsaturated carbonyl groups, isocyanurate derivatives having at least one pendant acrylate group, isocyanate derivatives having at least one pendant acrylate group, acrylated polyesters, and mixtures and combinations of the foregoing.

The term "acrylate", as used herein, includes organic compounds that have pendant alpha, beta unsaturated carbonyl groups. Examples of such organic compounds include acrylates, methacrylates, acrylamides, and crotonates.

Acrylated urethanes are preferred acrylated polymers. Acrylated urethanes are diacrylate esters of hydroxy terminated NCO extended polyesters or polyethers. Aromatic acrylated urethanes suitable for this invention can have backbones formed from toluene diisocyanate, diphenylmethane diisocyanate, or tetramethylxylene diisocyanate. Aliphatic acrylated urethanes suitable for this invention can have backbones formed from isophorone diisocyanate, dicyclohexylmethane diisocyanate, or hexamethylene diisocyanate. Examples of commercially available acrylated urethanes include "Uvithane 782", available from Morton International Inc. and "Ebecryl 6700", available from UCB Radcure. These polymers can be used to form an aqueous emulsion via an emulsification process. Alternatively, acrylated urethanes in emulsion form are commercially available, e.g., "NeoRad" emulsions, commercially available from ICI Resins US.

Acrylated polyesters are also preferred acrylated polymers. An acrylated polyester is a condensation product of a diol (e.g., ethylene glycol) or a polyol (e.g. polyethylene glycol) with a dicarboxylic acid (e.g., terephthalic acid, maleic acid) in which the diol or polyol is employed in molar excess to form a hydroxyl-terminated polymer. Subsequently, the hydroxyl groups are esterified with acrylic acid to form the acrylate groups. Examples of acrylated polyesters include "Photomer 5007" and "Photomer 5018", both of which are commercially available from Henkel Corporation. Alternatively, acrylated polyesters in emulsion form are commercially available, e.g., "IRR-114", commercially available from UCB Radcure.

Acrylated acrylic polymers can be prepared in several ways, and are preferably prepared in either of the following ways:

(1) It is possible to produce acrylated acrylic polymers by partial esterification of polymers of acrylic acid or methacrylic acid, as is well-known in the art. In one method, an emulsion polymer or copolymer having carboxyl functional groups is first formed by polymerizing or copolymerizing at least one monomer that contains a carboxyl group (e.g., acrylic acid or methacrylic acid). Subsequently, an acrylate functional monomer (e.g. hydroxyethyl acrylate or glycidyl methacrylate) can be slowly added to the emulsion polymer or copolymer and allowed to react with the carboxyl groups in the emulsion polymer or copolymer.

(2) An emulsion polymer or copolymer can be formed by polymerizing monomers that already contain acrylate functionality. Possiblilities include allyl methacrylate or N—N dimethylamino ethyl methacrylate. An example of a commercially available acrylated acrylic polymer emulsion has the trade designation "NeoRad NR-3800", and is available from ICI Resins US.

Acrylated epoxies are diacrylate esters of epoxy resins, such as the diacrylate esters of bisphenol A epoxy resin. Examples of commercially available acrylated epoxies include "Ebecryl 3200", "Ebecryl 3201", "Ebecryl 3500", and "Ebecryl 3700", commercially available from UCB Radcure.

The aminoplast derivatives suitable for this invention have at least one pendant alpha, beta unsaturated carbonyl group per molecule or oligomer. These unsaturated carbonyl groups can be selected from acrylate, methacrylate, or acrylamide groups. Examples of such derivatives include N-hydroxymethyl-acrylamide, N,N'oxydimethylenebisacrylamide, ortho- and para-acrylamidomethylated phenol, acrylamidomethylated phenolic novolac, and combinations thereof. These materials are further described in U.S. Pat. No. 4,903,440, and U.S. Pat. No. 5,236,472, both of which are incorporated herein by reference.

Isocyanurate derivatives having at least one pendant acrylate group and isocyanate derivatives having at least one pendant acrylate group are further described in U.S. Pat. No. 4,652,274, which is incorporated herein by reference. The preferred isocyanurate material is a triacrylate of tris(hydroxyethyl) isocyanurate.

It may be desirable in some instances to incorporate ethylenically unsaturated compounds into the acrylate polymer emulsion to provide desired properties, e.g., higher cross-link density, lower cross-link density.

Ethylenically unsaturated compounds suitable for modifying properties of the aqueous acrylate polymer emulsion include both monomeric and polymeric compounds that contain atoms of carbon, hydrogen, and oxygen, and optionally, nitrogen and the halogens. Oxygen or nitrogen atoms, or both, are present in ether, ester, urethane, amide, and urea groups. Ethylenically unsaturated compounds preferably have a molecular weight of less than about 4,000 and are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Other ethylenically unsaturated compounds suitable for this invention include monoallyl, polyallyl, and polymethallyl esters and amides of carboxylic acids, such as diallyl phthalate, diallyl adipate, and N,N-diallyladipamide.

Other representative examples of unsaturated monomers include methyl methacrylate, ethyl methacrylate, styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerthyitol triacrylate, pentaerythritol trimethacrylate, pentaerythritol tetramethacrylate and pentaerythritol tetraacrylate, tris(2-acryloyloxyethyl)isocyanurate, 1,3,5-tri(2-methylacryloxyethyl)-s-triazine, acrylamide, methylacrylamide, N-methylacrylamide, N,N-dimethylacrylamide, N-vinylpyrrolidone, and N-vinylpiperidone.

The acrylate polymer is usually not soluble or dispersible in water. However, a dispersing agent may be added to allow the acrylate polymer droplets to be dispersed or suspended in water, thereby forming a liquid-liquid dispersion, commonly known as an emulsion. It is preferred that the droplets of acrylate polymer be uniformly dispersed or suspended within the water.

The dispersing agent can be an emulsifier. There are three main classes of emulsifiers: cationic, anionic, and nonionic. Examples of cationic emulsifiers include quaternary ammonium salts. Examples of anionic emulsifiers include triethylamine and sulphonated materials. Examples of nonionic emulsifiers include nonylphenol ethoxylate, commercially known as "Triton X-100". The acrylate-based emulsion preferably includes from about 0.01 to about 15 weight percent, more preferably from about 0.1 to about 2 weight percent of the dispersing agent.

Alternatively, the dispersing agent can be a compound that causes an acid/base reaction that causes in the droplets of acrylate polymer to be suspended and stabilized in water. For example, an acrylated urethane can be formed by the reaction in water of isophorone diisocyanate, a polyester diol, dimethylolpropionic acid, and a hydroxyfunctional acrylate, preferably hydroxyethyl acrylate. This acrylated polyurethane will have pendant ionizable acid groups from the dimethylolpropionic acid. These ionizable acid groups can react with triethylamine, thereby resulting in a stabilized suspension in water.

A dispersing agent may not be necessary, if the acrylate polymer contains sufficient polar groups to enable it to be dispersed in the water to form an emulsion without the aid of a dispersing agent, i.e., if the acrylate polymer is "self-emulsifying".

The acrylate-based emulsion may include deionized water, tap water, or a mixture of the two. The emulsion preferably includes from about 5 to about 90 weight percent, more preferably from about 30 to about 80 weight percent water.

The binder precursor may also include thermosetting resins, other than the required acrylate polymers. In some instances, the addition of a thermally-curable resin enhances grinding performance of the abrasive article.

Thermosetting resins that are preferred for this invention include phenolic resins, aminoplast resins, urethane resins, epoxy resins, ethylenically unsaturated resins, acrylated isocyanurate resins, urea-formaldehyde resins, acrylated urethane resins, acrylated epoxy resins, and mixtures thereof. Phenolic resins are generally more preferred, as they impart good hardness and toughness, have good thermal properties, and are relatively low in cost. Preferred phenolic resins have a molar ratio of formaldehyde to phenol of greater than or equal to one to one, typically from 1.5:1.0 to 3.0:1.0. The level of free formaldehyde in the phenolic resin is preferably from 0 to 6%, more preferably from 0 to 3%. The pH of the resin is preferably from 7 to 12, more preferably from 7.5 to 10.5.

Examples of commercially available phenolic resins suitable for this invention include those known by the tradenames "Durez" and "Varcum", commercially available from Occidental Chemical Corp-; "Resinox", commercially available from Monsanto Company; "Aerofene", commercially available from Ashland Oil, Inc., and "Arotap", commercially available from Ashland Oil, Inc. A preferred phenolic resin is "GP044N06", commercially available from Georgia-Pacific Corporation, Atlanta, Ga. The ratio of the weight of solids in the acrylate polymer emulsion portion to the weight of solids in the phenolic resin portion preferably ranges from 1:7 to 9:1.

Another preferred resin is a polyvinyl alcohol-based bead or pellet, commercially available from Air Products and Chemicals, Inc. under the trade designation "Vinex 2034". The polyvinyl alcohol helps to stabilize the acrylate-based emulsion and aids in the suspension of the droplets of acrylic polymer. A preferred binder precursor includes a blend of an aqueous acrylate polymer emulsion, a phenolic resin, and a polyvinyl alcohol resin.

In some instances, the binder precursor may also include a latex emulsion, which may soften the cured binder, thereby enhancing flexibility of the abrasive article. Examples of latex emulsions suitable for this invention include acrylonitrile butadiene emulsions, acrylic emulsions, butadiene emulsions, butadiene styrene emulsions, and combinations thereof. Commercially available latex emulsions suitable for this invention include, but are not limited to, "RHOPLEX" and "ACRYLSOL" resins, commercially available from Rohm and Haas Company, "FLEXCRYL" and "VALTAC" resins, commercially available from Air Products and Chemicals, Inc., "SYNTHEMUL" and "TYLAC" resins, commercially available from Reichhold Chemical, Inc. Preferred compositions include from about 5 to about 30 weight percent latex emulsion.

Preferred compositions may also include curing agents, to accelerate the polymerization or curing of the acrylate polymer. The term "curing agent", as used herein, includes cross-linking agents, catalysts, initiators, and photoinitiators. Preferred compositions contain from 0.01 to 20 weight percent, more preferably from 0.1 to 10 weight percent of the curing agent. Curing agents suitable for this invention include those that generate free radicals when exposed to thermal energy, e.g., peroxides (e.g., benzoyl peroxide), azo compounds, benzophenones, and quinones, or when exposed to ultraviolet light, e.g., organic peroxides, azo compounds, quinones, and benzophenones, or when exposed to visible light, e.g., those described in U.S. Pat. No. 4,735,632, incorporated herein by reference. Examples of commercially available photoinitiators include the "Irgacure" and "Darocur" family of photoinitiators, commercially available from Ciba.

The binder precursor can further comprise optional additives, e.g., fillers, grinding aids, coupling agents, fibers, lubricants, wetting agents, antistatic materials, surfactants, pigments, dyes, plasticizers, and suspending agents, all of which are well known in the art.

The binder precursor of the invention may be used in coated abrasive articles, bonded abrasive articles, lapping coated abrasive articles, and nonwoven abrasive articles, as described above.

Suitable backings for coated or lapping coated abrasive articles include polymeric film, primed polymeric film, cloth, paper, vulcanized fiber, nonwovens, and treated versions thereof and combinations thereof. The cloth or nonwoven can be formed from glass, polyester, polyamide, rayon, cotton, or combinations thereof. Suitable polymeric films include those containing polyester, polyamide, polyethylene, and polypropylene.

The binder precursor can be used in any or all of the coatings that are conventionally used in forming abrasive articles. For example, the binder precursor can be used as the make coat, i.e., the adhesive coat which secures the abrasive particles to the backing, the size coat, i.e., the adhesive coat over the abrasive particles which reinforces the abrasive particles, the supersize coat, i.e., the adhesive coat over the size coat, or as a backing treatment or coat, e.g., as a coating which saturates the backing material, a surface coat which is present on the back side of the backing, opposite the abrasive particles, or a presize coat which is present on the front side of the backing, between the backing and the make coat. If desired, the binder precursor need not be used for all of the coating layers, i.e., conventional binders can be used for one or more of the coating layers. A preferred application is to use the binder precursor of the invention as a treatment coat for paper backings.

The binder precursors can be used to manufacture a coated abrasive article using any conventional procedure. A preferred procedure involves the following steps. First, the backing is saturated with a precursor of a saturant coat by any conventional technique, such as dip coating or roll coating. Then a plurality of other coating layers, as described above, are applied by conventional techniques, e.g., roll coating, die coating, or knife coating, as is well known in the art. Each layer is typically dried, or at least partially cured, prior to application of the next layer. After the last layer is applied, the underlying layers, if previously only dried or partially cured, can be subjected to additional cure. Of course, it should be noted that abrasive particles are projected into the make coat layer, before that coat is dried or partially cured. Usually, the abrasive particles are projected into the make coat by an electrostatic coating process. In some instances, it is preferred to partially cure or gel the make coat prior to applying the abrasive particles. The partially cured make coat then inhibits the wetting of the abrasive particles, thereby tending to reduce the number of abrasive particles that adhere to the make coat during deposition (e.g., projection), thereby minimizing multiple layers of abrasive particles in the very fine grade coated abrasive article. This optional step is further described in the assignee's copending application U.S. Ser. No. 07/970,950, incorporated herein by reference.

In order to at least partially cure the binder precursor, the binder precursor is exposed to an energy source, for example, a source of thermal energy, a source of radiation energy, e.g., electron beam, ultraviolet light, or visible light, or a combination of energy sources. In general, the curing conditions selected will depend upon the composition and density of the binder precursor and the thickness of the coat, as is well known in the art. When radiation is used, preferred exposure times generally range from about 0.1 to about 500 seconds, more preferably from about 0.5 to about 100 seconds, most preferably from about 0.5 to about 50 seconds. The level of ultraviolet or visible light required is in the range of from about 200 to about 1,000 milliJoules/cm$^2$. Preferred electron beam (ionizing) radiation intensities range from about 0.1 to about 10 Mrad, more preferably from about 1 to about 10 Mrad. Preferred parameters for thermal curing range from about 50° C. to about 250° C. for about 15 minutes to about 16 hours in a convection oven.

During the manufacture of the abrasive article, the water from the acrylate-based emulsion needs to be substantially removed. Removal is typically accomplished by controlled heating. Irradiation lamps that are used for photopolyerization produce some heat. Additional heat may be applied, if necessary, before or after irradiating. Care must be taken not to remove the water at an accelerated rate, otherwise undesirable air bubbles may form in the binder.

If one or more of the coats comprise conventional binder precursors, these coats can be polymerized by heat, radiation, or combinations of various energy sources, depending upon the chemistry of the binder precursor used.

Lapping coated abrasive articles may also be manufactured using any conventional process. A suitable procedure involves the following steps. First, the binder precursor is mixed with the abrasive particles to form an abrasive dispersion or slurry. Generally, it is preferred that the abrasive particles be uniformly dispersed throughout the binder precursor. After the abrasive slurry is prepared, it is applied to the front side of a backing by any conventional means such as spray coating, roll coating, die coating, or knife coating. Next, the abrasive slurry is exposed to an energy source to cure or polymerize the binder precursor. Another method for making a lapping coated abrasive article is described in U.S. Pat. No. 5,152,917, incorporated herein by reference.

Nonwoven abrasive articles are further described in U.S. Pat. No. 2,958,593, incorporated herein by reference. Preferred fibers for substrates for nonwoven abrasive articles include polyester, polyamide, polyethylene, and polypropylene. A preferred method of preparing a nonwoven abrasive article involves the following steps. First, an abrasive dispersion or slurry is prepared in the manner described above. After the abrasive slurry is prepared, it is applied into a porous, open, lofty, nonwoven backing by any conventional means such as spray coating, roll coating, die coating, or knife coating. Spray coating is the preferred technique. Next, the abrasive slurry is exposed to an energy source to cure or polymerize the binder precursor.

A bonded abrasive article may be manufactured by preparing an abrasive slurry, as described above, and molding the same under heat and pressure, as is well known in the art. Bonded abrasive articles are described in greater detail in U.S. Pat. No. 5,213,591, incorporated herein by reference.

The following non-Limiting examples will further illustrate the invention. All parts, percentages, ratios, etc., in the examples are by weight unless otherwise indicated. The following designations are in the examples.

UAD1 is an acrylated urethane emulsion that is commercially available from ICI Chemicals and Polymers, London, England under the trade designation "Neorad 3709".

UAD2 is an acrylated acrylic emulsion that is commercially available from ICI Chemicals and Polymers, London, England under the trade designation "Neorad 3800."

RPR1 is a conventional resole phenolic resin that is commercially available from Georgia-Pacific Corporation under the trade designation "GP 044N06."

RPR2 is a conventional resole phenolic resin that has a formaldehyde to phenol ratio of about 1.8:1, contains 70% solids, and is catalyzed with sodium hydroxide.

PA1 is an amine based plasticizer that is commercially available from Texaco Chemical Company under the trade designation "Jeffamine D-230."

PEDA is a polyethylene glycol diacrylate that is commercially available from Sartomer.

PEG is a polyethylene glycol having a molecular weight of 600 that is commercially available from Union carbide Corp.

WA1 is a wetting agent that is commercially available from Union Carbide Corp. under the trade designation "Silwet L7604."

WA2 is a wetting agent that is commercially available from Akzo Chemicals Inc. under the trade designation "Interwet 33."

CA1 is a silane coupling agent that is commercially available from Union Carbide Corp. under the trade designation "A-1100."

PH1 is 2,2-dimethoxy-1-2-diphenyl-1-ethanone, which is commercially available from Ciba-Geigy Corp. under the trade designation "Irgacure 651."

PH2 is a photoinitiator commercially available from Ciba-Geigy Corp. under the trade designation "Darocur 1173."

SB1 is an 85/15 blend of 2-propylene glycol monoethylether and water.

SOLA is a blend of 2.25 parts polyvinyl alcohol that is commercially available under the trade name "Vinex 2034", 48.88 parts 2-propylene glycol monomethylether, and 48.88 parts water.

IRR is an acrylated polyester emulsion of 55% solids in water that is commercially available from UCB Radcure under the trade designation "IRR-114."

Disc Test Procedure I

The coated abrasive article for each example was converted into a 10.2 cm diameter disc and secured to a foam back-up pad by means of a pressure-sensitive adhesive. The coated abrasive disc and back-up pad assembly was installed on Schiefer testing machine, and the coated abrasive disc was used to abrade a polymethyl methacrylate polymer. The load was 4.5 kg. All of the testing was done underneath a water flood. The endpoint of the test was 2500 revolutions or cycles of the coated abrasive disc. The amount of polymethyl methacrylate polymer removed or cut was measured every 500 cycles. The surface finish (Rtm) of the polymethyl methacrylate polymer workpiece was measured after 500 cycles. Rtm is the mean of the maximum peak to valley height measured in microinches.

EXAMPLES

EXAMPLES 1-3

Comparative Example A

This set of examples compared various make coats. The backing for Examples 1, 2, and Comparative Example A was a 115 g/m² waterproof paper that did not contain a barrier coat. The backing for Example 3 was a waterproof paper (112 g/m²) that did contain a barrier coat. The make coat was applied at approximately 12 to 25 micrometers wet thickness onto the backing by a Mayer rod. Next, the resulting coated papers were exposed at 32 meters/minute to a Fusion Systems D bulb ultraviolet light operating at 120 Watts/cm. Then, grade 2000 JIS silicon carbide mineral was drop coated into the make coat. The resulting samples were thermally cured for thirty minutes at a temperature of 116° C. The binder precursor for the size coat was roll coated over the abrasive grains at an average weight of about 15 g/m². The resulting construction was heated for 70 minutes at a temperature of 116° C. The size coat was the same for all four examples. The binder precursor for the make coat for each example and the binder precursor for the size coat are set forth in Table 1.

The resulting coated abrasive articles were tested according to Disc Test Procedure I and the test results are set forth in Table 2.

TABLE 1

| Ingredient | Make Coat Ex. 1 (parts) | Make Coat Ex. 2, 3 (parts) | Make Coat Comp. Ex. A (parts) | Size Coat (parts) |
|---|---|---|---|---|
| UAD1 | 27.5 | 24.6 | — | — |
| RPR1 | 50.0 | 55.3 | — | — |
| RPR2 | — | — | 44.4 | 64.0 |
| PA1 | — | — | — | 24.0 |
| PEDA | — | — | 24.0 | — |
| PEG | — | — | 15.0 | — |
| WA1 | — | — | 0.2 | 0.5 |
| WA2 | — | — | 0.2 | 0.5 |
| CA1 | — | — | 1.0 | 1.0 |
| PH1 | — | — | 1.1 | — |
| PH2 | 1.5 | 1.5 | — | — |
| SB1 | 22.5 | 20.1 | 14.1 | — |
| EDR | — | — | — | 10.0 |
| IRR | — | — | — | — |

TABLE 2

| Example | Cut (grams) | | | | | Rtm |
|---|---|---|---|---|---|---|
| | 500 cycles | 1000 cycles | 1500 cycles | 2000 cycles | 2500 cycles | 500 cycles |
| 1 | 0.417 | 0.759 | 1.038 | 1.297 | 1.525 | 25.4 |
| 2 | 0.465 | 0.8324 | 1.113 | 1.363 | 1.600 | 25.6 |
| 3 | 0.458 | 0.802 | 1.107 | 1.401 | 1.651 | 28.2 |
| Comp. A | 0.245 | 0.456 | 0.610 | 0.721 | 0.863 | 28.2 |

EXAMPLES 4 AND 5

Comparative Examples B and C

The coated abrasive article for Example 4 was made in the same manner as was the coated abrasive article for Example 2, except that the abrasive particles were of grade 1000. The coated abrasive article for Example 5 was made in the same manner as was the coated abrasive article for Example 2, except that the abrasive particles were of grade 1200. The coated abrasive article for Comparative Example B was made in the same manner as was the coated abrasive article for Comparative Example A, except that the abrasive particles were of grade 1000. The coated abrasive article for Comparative Example C was made in the same manner as was the coated abrasive article for Comparative Example A, except that the abrasive particles were of grade 1200. The resulting coated abrasive articles were tested according to Disc Test Procedure I and the test results are set forth in Table 3.

TABLE 3

| Example | Cut (grams) (2500 cycles) | Rtm (500 cycles) |
|---|---|---|
| 4 | 3.940 | 47.2 |
| 5 | 2.316 | 29.0 |
| Comp. B | 2.605 | 38.2 |
| Comp. C | 1.370 | 23.2 |

EXAMPLES 6 AND 7

Comparative Example D

This set of examples compared various make coats. The coated abrasive articles were tested according to Disc Test Procedure I and the test results are set forth in Table 4. The backing for Examples 6 and 7 was a waterproof paper (112 g/m²) that contained a barrier coat. The make coat was applied at approximately 12 micrometers wet thickness onto the backing by a Mayer rod. Next, the resulting coated papers were exposed to a Fusion Systems D bulb ultraviolet light operating at 120 Watts/cm. For Example 6, the run speed was 45 meters/minute, and for Example 7 the run speed was 32 meters/minute. Then, grade 1000 JIS silicon carbide was drop coated into the make coat. Following this step, the resulting samples were thermally cured for thirty minutes at a temperature of 116° C. The binder precursor for the size coat was roll coated over the abrasive grains with an average weight of about 15 g/m². The resulting construction was heated for 70 minutes at a temperature of 116° C. The size coat for Examples 6 and 7 was the same as that for Example 1. The coated abrasive article of Comparative Example D was substantially identical to that of Comparative Example B, with the sole exception being that they were prepared on separate dates.

The make coat precursor for Example 6 consisted of 42.4 parts UAD2, 37.7 parts RPR1, 9.1 parts water, 10.8 SOLA, and 0.85 parts PH2. The make coat precursor for Example 7 consisted of 17.8 parts UAD1, 17.8 parts UAD2, 23.1 parts SB1, 40.8 parts RPR2, and 0.5 parts PH2.

TABLE 4

| Example | Cut (grams) (2500 cycles) | Rtm (500 cycles) |
| --- | --- | --- |
| 6 | 2.813 | 62.6 |
| 7 | 3.225 | 63.4 |
| Comp. D | 3.177 | 52.4 |

EXAMPLES 8–10

Comparative Example E

This set of examples is a comparison of three different ultraviolet-curable binder precursors for make coats coated onto a waterproof paper (115 g/m²) without barrier coat. ;the binder precursor for the make coat for the abrasive article of each example and the binder precursor for the size coat is set forth in Table 5. The coated abrasive article of Comparative Example E was substantially identical to that of Comparative Example C, with the exception that the processing line speed for preparing the article was different.

The binder precursors were pregelled prior to application of grade 1200 silicon carbide mineral, according to the coating procedure described in Example 1. The binder precursor for the make coat was thermally cured for thirty minutes at a temperature of 116° C. The size coat was a phenolic/plasticizer blend, which was cured for seventy minutes at a temperature of 116° C. The processing line speed of the article is set forth in Table 6. Abrasive articles were converted into 4-inch pressure-sensitive adhesive-backed disks for Schiefer testing. The results of the tests are set forth in Table 6.

TABLE 5

|  | Make Coat Ex. 8, 9 (parts) | Make Coat Ex. 10 (parts) | Size Coat (parts) |
| --- | --- | --- | --- |
| UAD1 | — | — | — |
| RPR1 | 40.3 | 47.3 | — |
| RPR2 | — | — | 64.0 |
| PA1 | — | — | 24.0 |
| PEDA | — | — | — |
| PEG | — | — | — |
| WA1 | — | — | 0.5 |
| WA2 | — | — | 0.5 |
| CA1 | — | — | 1.0 |
| PH1 | — | — | — |
| PH2 | 0.6 | 0.5 | — |
| SB1 | 21.5 | 21.5 | — |
| EDR | — | — | 10.0 |
| IRR | 37.6 | 28.1 | — |

TABLE 6

| Example | Line speed (ft/min) | Cut (grams) (2500 cycles) | Rtm (500 cycles) |
| --- | --- | --- | --- |
| 8 | 140 | 2.789 | 31.6 |
| 9 | 105 | 2.801 | 32.6 |
| 10 | 105 | 2.465 | 34.9 |
| Comp. E | 140 | 1.900 | 23.2 |

The significant results from these examples are as follows:

1. The make coats made from the polyester acrylate dispersion are clearly superior to the control; 30–50% improvement in cut is possible.
2. The grinding performance of the abrasive articles of Examples 1–10 frequently exceeds that of the abrasive articles of the Comparative Examples, and only a marginally coarser finish is generated.
3. The performance of Examples 8 and 9 appears to be unaffected by the range of line speeds chosen.
4. The use of polyvinyl alcohol in the make coat of the article of Example 6 allows the use of a lower amount of SB1 without resulting in a decrease in abrasive performance.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive article comprising a plurality of abrasive particles bonded into a substrate or bonded onto a backing by means of a cured binder, said cured binder being formed by curing a binder precursor comprising an aqueous acrylate polymer emulsion.

2. The abrasive article of claim 1 wherein said article is selected from the group consisting of coated abrasive articles, lapping coated abrasive articles, and nonwoven abrasive articles.

3. The article of claim 1 wherein said binder precursor is curable by radiation.

4. The article of claim 3 wherein said binder precursor is curable by ultraviolet radiation.

5. The article of claim 1 wherein said binder precursor further comprises a thermosetting resin selected from the group consisting of phenolic resins, aminoplast resins, urethane resins, epoxy resins, ethylenically unsaturated resins, acrylated isocyanurate resins, urea-formaldehyde resins, acrylated urethane resins, acrylated epoxy resins, and mixtures thereof.

6. The article of claim 5 wherein said resin is a phenolic resin.

7. The article of claim 6 wherein the ratio of the weight of solids in said acrylate polymer emulsion to the weight of solids in said phenolic resin is from about 1:7 to about 9:1.

8. The article of claim 1 wherein said acrylate polymer emulsion includes a dispersing agent to stabilize the emulsion.

9. The article of claim 1 wherein said acrylate polymer in said emulsion is an acrylated urethane.

10. The article of claim 1, wherein said acrylate polymer in said emulsion is a acrylated polyester.

11. The article of claim 1 wherein said binder precursor further comprises a latex emulsion.

12. The article of claim 11 wherein said binder precursor further comprises polyvinyl alcohol.

13. The article of claim 1 wherein said binder precursor further comprises polyvinyl alcohol.

14. An abrasive article comprising a plurality of abrasive particles bonded together by means of a cured binder, said cured binder being formed by curing a binder precursor comprising an aqueous acrylate polymer emulsion.

15. The article of claim 14 wherein said binder precursor is curable by radiation.

16. The article of claim 15 wherein said binder precursor is curable by ultraviolet radiation.

17. The article of claim 14 wherein said binder precursor further comprises a thermosetting resin selected from the group consisting of phenolic resins, aminoplast resins, urethane resins, epoxy resins, ethylenically unsaturated resins, acrylated isocyanurate resins, urea-formaldehyde resins, acrylated urethane resins, acrylated epoxy resins, and mixtures thereof.

18. The article of claim 17 wherein said resin is a phenolic resin.

19. The article of claim 18 wherein the ratio of the weight of solids in said acrylate polymer emulsion to the weight of solids in said phenolic resin is from about 1:7 to about 9:1.

20. The article of claim 14 wherein said acrylate polymer emulsion includes a dispersing agent to stabilize the emulsion.

21. The article of claim 14 wherein said acrylate polymer in said emulsion is an acrylated urethane.

22. The article of claim 14, wherein said acrylate polymer in said emulsion is an acrylated polyester.

23. The article of claim 14 wherein said binder precursor further comprises a latex emulsion.

24. The article of claim 23 wherein said binder precursor further comprises polyvinyl alcohol.

25. The article of claim 14 wherein said binder precursor further comprises polyvinyl alcohol.

26. A method of forming an abrasive article comprising the steps of:
   providing a binder precursor comprising an aqueous acrylate polymer emulsion;
   applying said binder precursor to a substrate;
   applying abrasive particles to said binder precursor;
   at least partially curing said binder precursor and substantially removing the water from said aqueous acrylate polymer emulsion.

27. The method of claim 26 further comprising the step of partially curing said binder precursor prior to applying said abrasive particles thereto.

28. The method of claim 26 wherein said binder precursor is cured by radiation energy.

29. The method of claim 26 wherein said binder precursor further comprises a phenolic resin.

30. The method of claim 29 wherein the ratio of the weight of solids in said acrylate polymer emulsion to the weight of solids in said phenolic resin is from about 1:7 to 9:1.

31. A method of forming an abrasive article comprising the steps of:
   providing a binder precursor comprising an aqueous acrylate polymer emulsion;
   dispersing a plurality of abrasive particles in said binder precursor to form a slurry;
   at least partially curing said binder precursor and substantially removing the water from said aqueous acrylate polymer emulsion.

32. The method of claim 31 further comprising the step of applying said slurry to a substrate prior to curing.

33. The method of claim 31 further comprising the step of molding said slurry to form a shape while the slurry is being cured.

34. The method of claim 31 wherein said binder precursor further comprises a phenolic resin.

35. The method of claim 34 wherein the ratio of the weight of solids in said acrylate polymer emulsion to the weight of solids in said phenolic resin is from about 1:7 to 9:1.

36. The method of claim 31 wherein said acrylate polymer in said emulsion is an acrylated polyester.

* * * * *